No. 104,826. PATENTED JUNE 28, 1870.
D. H. CHAMBERLAIN.
RUBBER ROLLER FOR WRINGERS, &c.
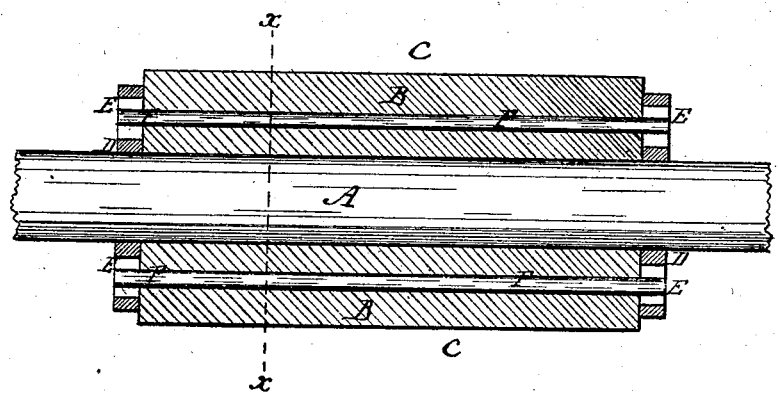
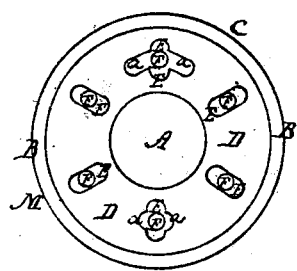
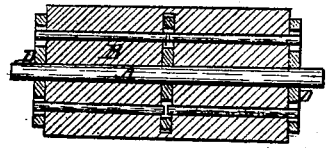
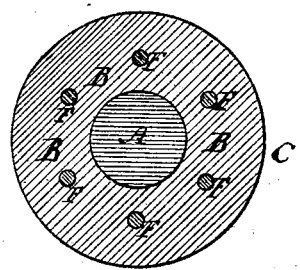
WITNESSES. INVENTOR.

United States Patent Office.

DEXTER H. CHAMBERLAIN, OF WEST ROXBURY, MASSACHUSETTS.

Letters Patent No. 104,826, dated June 28, 1870.

IMPROVED RUBBER ROLLER FOR WRINGERS, &c.

The Schedule referred to in these Letters Patent and making part of the same

*To all persons to whom these presents shall come:*

Be it known that I, DEXTER H. CHAMBERLAIN, of West Roxbury, county of Norfolk and State of Massachusetts, have invented a certain new and useful Improvement in Mode of Securing India Rubber to Shafts, &c.; and that the following is a full and exact description of the same, reference being had to the accompanying drawing.

The present invention relates to securing India rubber, or equivalent material, to shafts of wringer-rolls more particularly, although it is susceptible of adaptation for fastening rubber to shafts for other rolls, and to the "frictional gearing" described and embraced in the schedule annexed to the Letters Patent issued to me the 22d day of March, A. D. 1870, numbered 100,977, as well as to other purposes.

The object sought to be obtained in the present invention is to overcome the effect of pressure on the rubber, to loosen the rubber from the shaft, causing, finally, such a separation of the two, that is, the shaft and the rubber, that the one will turn or move within the other.

The invention consists in securing the rubber to the shaft, &c., by "dogging," if it may be so termed, the one to the other with the "dog" connection, suitably constructed to move in, with pressure, on the rubber, while at the same time the shaft and rubber will turn as one.

In the accompanying drawing, my improved mode of securing India rubber to shafts, &c., is illustrated, Figure 1 being an end view of a roll, having its rubber secured according thereto.

Figure 2, a longitudinal section through the rubber, with the central shaft in side view.

Figure 3, a transverse vertical section in plane of line *x x*, fig. 1.

Figure 4 is a view showing modification, to be hereafter referred to.

A, in the drawing, represents a shaft, and B rubber surrounding the same for a portion of its length, the two forming a roll, C.

D, head-plates, keyed or otherwise fastened to shaft A, against the ends of the rubber B.

E, radial slots in head-plates D.

F, pins or rods imbedded and arranged in the rubber B, from end to end, in parallel lines, or nearly so, to its axis, said pins projecting from each end of the rubber into the said radial slots of the head-plates D. By these pins or rods F the rubber is "dogged" to the head-plates D, and, as they are keyed to the shaft, it is obvious, in turning the shaft, the rubber is carried with it, the whole turning as one.

With pressure on the rubber roll C, as, for instance, when used as a wringer-roll for clothes, the rod F, extended through the rubber at the point where such pressure is acting, moves in with it, playing in the radial slots E, the several rods F being thus pressed in with the rubber, as the part of the rubber in which they are respectively located is pressed upon in the turning of the roll.

The rods F, with radial slots, may be more or less in number, but it is best that they should be located sufficiently close together, consistent with the strength and size of the roll, to secure the action above described at as many points of the rubber, in the turning of the roll, as is possible.

To accommodate, if desired, the dog connection to a lateral movement of the rods F, the slots are provided with side passages, as shown at *a*.

This lateral movement of the pins occurs more especially, and is the most observable, in connection with the pins each side of the point where pressure is on the rubber, as, for instance, suppose pressure to be on the rubber at M, the dog-pins each side of such point will be more or less moved laterally, in consequence of such pressure.

In fig. 4 I show a modification, wherein, between the two ends of the rubber B, a head-plate, slotted as described for the head-plates D, may be located, and each pin made in two parts, moving in the end head plate slots, and the slots of the intermediate head-plate, with the edge of such intermediate head-plate covered and encased with rubber, as shown, or not.

It may be remarked that, as between my improved mode of securing India rubber to shafts, &c., as herein described, and the modes heretofore employed and practiced, the distinctive feature is in the fact that, in the latter, the fastening resists the pressure on the rubber, while, in the present improvement, the fastening moves in with the same, or, in other words, it adjusts itself to such pressure.

Having thus described my improved mode of securing India rubber to shafts, &c.,

What I claim as my invention, and desire to secure by Letters Patent, is—

A roll, &c., of India rubber, or equivalent material, secured to its shaft by a fastening which is susceptible of movement by pressure on the rubber, through the medium of rods playing in openings in the head-plates, substantially as described.

The above specification of my invention signed by me this 23d day of February, A. D. 1870.

D. H. CHAMBERLAIN.

Witnesses:
 ALBERT W. BROWN,
 EDWIN W. BROWN.